United States Patent [19]

Sasaki

[11] Patent Number: 4,690,572

[45] Date of Patent: Sep. 1, 1987

[54] STATIC PRESSURE GAS BEARING APPARATUS FOR TURBOCHARGER

[75] Inventor: Naoto Sasaki, Zushi, Japan

[73] Assignee: Nissan Motor Co., Ltd., Yokohama, Japan

[21] Appl. No.: 925,220

[22] Filed: Oct. 31, 1986

[30] Foreign Application Priority Data

Nov. 1, 1985 [JP] Japan .......................... 60-168637[U]

[51] Int. Cl.[4] .............................................. F16C 32/06

[52] U.S. Cl. .................................... 384/120; 137/110; 384/399; 384/448; 384/100

[58] Field of Search ............... 384/120, 118, 148, 399, 384/100, 109, 398, 373

[56] References Cited

U.S. PATENT DOCUMENTS

| | | | |
|---|---|---|---|
| 4,185,878 | 1/1980 | Robert | 384/120 |
| 4,215,903 | 8/1980 | Andrews | 384/399 |
| 4,303,089 | 12/1981 | Gage et al. | 137/110 |
| 4,366,993 | 1/1983 | Ono et al. | 384/120 |

FOREIGN PATENT DOCUMENTS 60-55738 4/1985 Japan .

*Primary Examiner*—Lenard A. Footland

*Attorney, Agent, or Firm*—Schwartz, Jeffery, Schwaab, Mack, Blumenthal & Evans

[57] ABSTRACT

A static pressure gas bearing apparatus equipped with a static pressure gas bearing that can support in floated state the rotating shaft of the turbocharger to be placed on an internal combustion engine comprises an air pump device for pressurizing and supplying a gas, an accumulator for storing the pressurized gas supplied form the air pump device, a pressurized gas supply passage device for connecting the accumulator to the static pressure gas bearing, a bypass passage device for connecting the air pump device to the static pressure gas bearing by bypassing the accumulator, and a control device for controlling the opening and the closing of the bypass passage device in response to the internal pressure of the accumulator.

5 Claims, 2 Drawing Figures

STATIC PRESSURE GAS BEARING APPARATUS FOR TURBOCHARGER

BACKGROUND OF THE INVENTION

The present invention relates to a static pressure gas bearing apparatus for turbocharger which is to be placed on an internal combustion engine.

In general, a turbocharger for an internal combustion engine which supercharges the suction gas by utilizing the pressure energy of the exhaust gas is rotated at high speed so that reducing the shaft friction is a major factor which is responsible for improving its performance.

With this in mind, the present applicant proposed a bearing apparatus which supplies pressurized air as the shaft lubricating medium of the turbocharger (see Japanese Laid-Open Utility Model No. 60-55738).

The apparatus has a static pressure gas bearing 1 with a configuration that supports a rotating shaft 2 of the turbocharger in floated state by supplying pressurized air to the space between the rotating shaft 2 and a bearing unit 4, as shown in FIG. 1, and air that is stored under pressure in an accumulator is supplied to the static pressure gas bearing 1 through a pressurized air supply passage 5.

Disposed midway in an air conduit 22 that connects the accumulator 7 to an air pump 8 which is driven either mechanically by the engine or by an electric motor, is a check valve 9, and analogously disposed midway in an air conduit 21 that connects the accumulator to the static pressure gas bearing 1 is a regulating valve 6.

The regulating valve 6 is opened by a signal from the ignition switch and supplies air that has been accumulated in the accumulator 7 prior to the start of the engine to the bearing unit 4. On the other hand, when the engine is brought to a stop, it supplies air stored in the accumulator 7 to the bearing unit 4 for some time after the stop of the engine, by means of the timer function incorporated in the ignition switch, to avoid contact of the rotating shaft 2 of the turbocharger with the bearing unit 4.

Now, the pressurized air has to be supplied to the bearing unit 4 on two occasions, namely, immediately after the interruption and at the time of restarting of the engine, in the state in which the engine operation is interrupted, so that the volume of the accumulator 7 has to be made large in size. However, when the accumulator 7 is to be placed on a motor vehicle or the like, it leads to the difficulty of securing a sufficient internal pressure for the accumulator 7 due to the restriction on the available space that is limited.

Further, if by any chance a minute leakage of accumulated air occurs in the accumulator 7 or somewhere in the air conduits 21 and 22, and if it is overlapped with an operating condition such as a rapid acceleration immediately after the restarting of the engine, then there arises a fear of generating burning due to contact of the rotating shaft 2 of the turbocharger with the bearing unit 4 without receiving sufficient amount of air on the surface of the bearing.

SUMMARY OF THE INVENTION

To resolve the above problems, an object of the present invention is to provide a static pressure gas bearing apparatus which makes it possible to reduce the volume of the accumulator and prevent the burning and others of the bearing unit to enhance the reliability of the apparatus.

With the above object in view, the present invention resides in a static pressure gas bearing apparatus for turbocharger which supports, in floating condition, the rotating shaft of the turbocharger that is placed on an internal combustion engine by means of pressurized gas that is supplied from outside, said apparatus comprising air pump means for supplying pressurized gas, an accumulator for storing the pressurized gas sent from air pump means, pressurized gas supply passage means for connecting the accumulator to the constant pressure gas bearing, bypass passage means for connecting the air pump to the constant pressure gas bearing by bypassing the accumulator, and control means for controlling the opening and closing of the bypass passage means in response to the internal pressure of the accumulator.

DETAILED DESCRIPTION OF A PREFERRED EMBODIMENT

Figure 1:
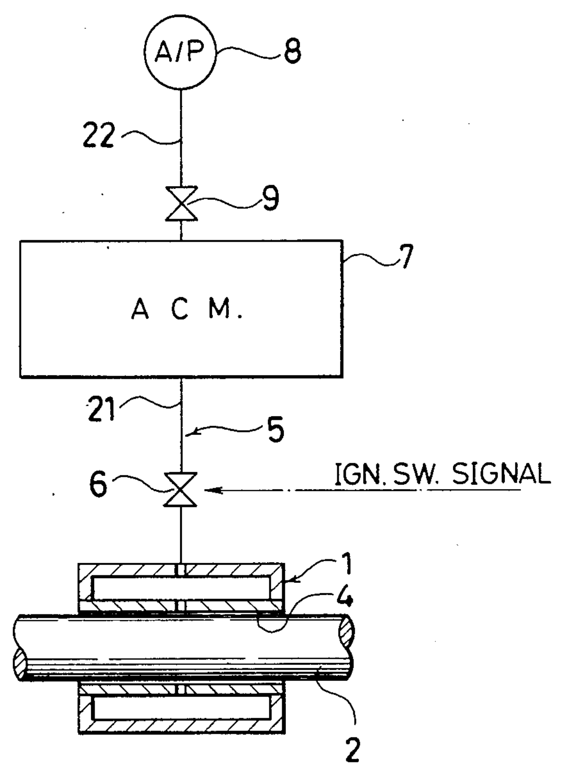
FIG. 1 is a schematic view showing the construction of a conventional static pressure gas bearing apparatus for the turbocharger.
Figure 2:
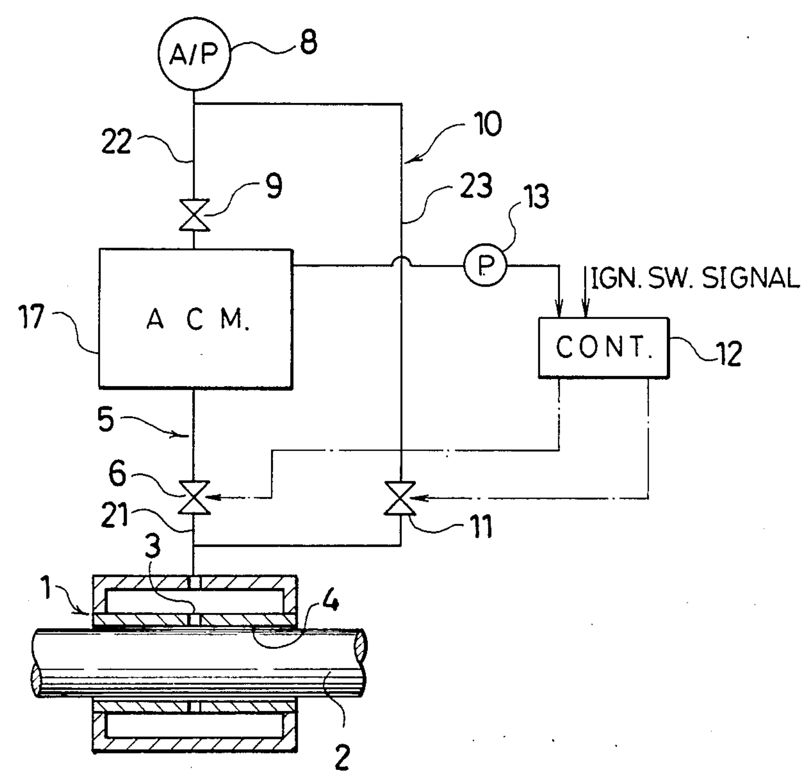
FIG. 2 is a schematic view showing the contruction of an embodiment of the static pressure gas bearing apparatus of the present invention.

In FIG. 2, an air pump 8 is connected via an air conduit 22 to an accumulator 17, and the accumulator 17 is connected via an air conduit 21 to the bearing 4 of the static pressure gas bearing to constitute a pressurized gas supply passage 5.

The air pump 8 is driven either by an electric motor or mechanically by the engine, and midway in the air conduits 22 and 21 there are arranged a check valve 9 and a regulating valve 6, respectively.

In addition, there is provided an air conduit 23 which connects the upstream side of the check valve 9 of the air conduit 22 to the downstream side of the regulating valve 6 of the air conduit 21. By inserting a regulating valve 11 midway in the air conduit 23, there is constructed a bypass passage 10 that leads the pressurized air that is discharged from the air pump 8 to the bearing unit 4 of the static pressure gas bearing 1 by bypassing the accumulator 17.

A controller 12 is inputted each of the detected signal from a pressure sensor 13 that detects the internal pressure of the accumulator 17 and the ignition switch signal. When the internal pressure of the accumulator falls below a predetermined valve during the period between the start and some time after interruption of the engine, the controller 12 carries out the control of closing the pressurized gas supply passage 5 and opening the bypass passage 10, by outputting the closing and opening signals to the regulating valves 6 and 11, respectively.

Next, the above-mentioned control operation will be described.

First, upon interruption of the engine, analogous to the conventional apparatus, air stored under pressure in the accumulator 17 is supplied, by means of the timer, for a fixed length of time following the turning-off of the ignition switch signal, to the bearing unit 4 through a hole 3 in the bearing. With such an arrangement, it is possible to avoid contact between the bearing unit 4 and the rotating shaft 2 of the turbocharger that keeps on rotating under inertia for some time after the stop of the engine.

With the engine is started, at the same time with the ignition switch signal is turned on, the electric motor is actuated to drive the air pump 8. If the internal pressure of the accumulator 17 is less than the predetermined value, the controller 12 satops, based on the detected signal from the pressure sensor 13, the outflow of the air stored under pressure from the accumulator 17 by closing the flow regulating valve 6. At the same time, the controller 12 opens the regulating valve 11 to supply the discharged air from the air pump 8 directly to the bearing unit 4 through the bypass passage 10. In this way, the rotating shaft 2 of the turbocharger is supported floating by the air led from the bypass passage 10.

In the state in which the bypass passage 10 is opened, a part of the pressurized air discharged from the air pump 8 is stored in the accumulator 17 through the check valve 9. When the internal pressure of the accumulator 17 exceeds the predetermined value after elapse of a fixed length of time, the controller 12 opens the regulating valve 6 and closes the regulating valve 11, by sensing the change, to supply pressurized air to the bearing unit 4 through the pressurized gas supply passage 5.

The time required for the internal pressure of the accumulator 17 to exceed the predetermined value varies with the opening areas of the regulating valves 6 and 11.

In this manner, if the internal pressure of the accumulator 17 is less than the predetermined value, the discharged air from the air pump 8 is led directly to the bearing unit 4 through the bypass passage 10. There is no need for the accumulator 17 to store air under pressure preparing for a re-starting of the engine, so that it becomes possible to reduce the capacity of the accumulator 17 greatly in comparison to the conventional apparatus.

Further, if by any chance there is generated a fine leakage in the accumulator 17 or in the air conduits 21 and 22, the controller 12 senses the fall of the internal pressure of the accumulator 17 to open the bypass passage 10, so that it is possible to prevent the burning or the like of the rotating shaft 2.

Moreover, immediately after stopping of the engine, air can also be supplied to the bearing unit 4 from the bypass passage 10 by operating the air pump 8 by means of the timer function without the help of the accumulator 17. Therefore, it may be considered to get rid of the pressurized gas supply passage 5. However, it is not desirable to remove the accumulator 17 in view of carrying out a stable air supply to the bearing unit 4 even during the operating time other than the starting and stopping of the engine.

Next, in the case of a construction in which the air pump 8 is driven mechanically by the engine, during the time from the starting of the engine to the actuation of the air pump 8, after the ignition switch was turned on, air that is stored under pressure in the accumulator 17 is supplied to the bearing unit 4 regardless of the internal pressure of the accumulator 17, by temporarily opening the regulating valve 6. In addition, at the same time with the starting of the engine, air discharged from the air pump 8 is supplied to the bearing unit 4 through the bypass passage 10, by opening the flow regulating valve 11.

Until the pressurized air is supplied from the bypass passage 10, the rotating shaft 2 of the turbocharger is either at a stop or is rotating at a very low speed, since the engine is in the state of immediately after the start, and the exhaust gas led to the turbocharger is small in quantity. Therefore, even when the internal pressure of the acucmulator 17 does not reach a predetermined pressure value needed for the time of high rotation, there is no fear of causing burning or the like of the rotating shaft 2.

As in the above, in a static pressure gas bearing apparatus which supplies air stored under pressure in the accumulator to the bearing unit for supporting the rotating shaft of the turbocharger that is placed on an internal combustion engine, the present invention forms a bypass passage which supplies the discharged air from the air pump to the bearing unit by bypassing the accumulator. When the internal pressure of the accumulator falls below the predetermined value, the bypass passage is arranged to be opened. Thus, at the time of starting the engine, it is possible to supply pressurized air from the air pump directly to the bearing unit, by opening the bypass passage. Accordingly, it is possible to reduce the volume of the accumulator, making it extremely advantageous in putting the apparatus on a vehicle. In addition, if by any chance there is generated a leakage of air from the accumulator, it is possible to prevent the burning of the bearing unit by opening the bypass passage, enhancing the reliability of the apparatus.

What is claimed is:

1. A static pressure gas bearing apparatus equipped with a static pressure bearing that can support in floated state the rotating shaft of the turbocharger to be placed on an internal combustion engine, said apparatus comprising:

air pump means for pressurizing and supplying a gas;

an accumulator for storing the pressurized gas supplied from said air pump means;

pressurized gas supply passage means for connecting said accumulator to the static pressure gas bearing;

bypass passage means for connecting said air pump to the static pressure gas bearing by bypassing said accumulator; and control means for controlling the opening and the closing of said bypass passage means in response to the internal pressure of said accumulator.

2. The static pressure gas bearing apparatus as claimed in claim 1 wherein said control means has a pressure sensor for detecting a predetermined air pressure within the accumulator and a controller inputting a signal from the pressure sensor and a signal from an ignition switch of the internal combustion engine, each of said pressurized gas supply passage means and said bypass passage means having a regulating value for regulating the pressurized air flowing therethrough, each of said regulating valves being opened and closed by output signals from the controller.

3. The static pressure gas bearing apparatus as claimed in claim 2 wherein the regulating valve of said bypass passage means is opened when the air pressure within the accumulator is lower than the predetermined air pressure.

4. The static pressure gas bearing apparatus as claimed in claim 2 wherein said both regulating valves are opened irrespective of the air pressure within the accumulator until the air pump means is actuated after the internal combustion engine has started.

5. The static pressure gas bearing apparatus as claimed in claim 1 wherein a check valve is disposed in an air conduit for connecting the air pump means to the accumulator.

* * * * *